United States Patent [19]
Whyzmuzis

[11] Patent Number: 5,714,526
[45] Date of Patent: Feb. 3, 1998

[54] METHOD OF PREPARING RESIN/PIGMENT COMPOSITIONS FOR PRINTING INKS

[75] Inventor: Paul D. Whyzmuzis, deceased, late of Hatfield, Pa., by Carol Whyzmuzis, legal representative

[73] Assignee: Henkel Corporation, Plymouth Meeting, Pa.

[21] Appl. No.: 571,789

[22] Filed: Dec. 13, 1995

Related U.S. Application Data

[63] Continuation-in-part of Ser. No. 396,824, Mar. 2, 1995, abandoned.

[51] Int. Cl.$^6$ .............................. C09D 5/00; C09D 11/00
[52] U.S. Cl. .......................... 523/161; 524/606; 524/607; 524/608
[58] Field of Search ..................... 523/161; 524/606, 524/607, 608

[56] References Cited

U.S. PATENT DOCUMENTS

| | | | |
|---|---|---|---|
| Re. 28,533 | 8/1975 | Drawert et al. | 260/404.5 |
| 3,157,681 | 11/1964 | Fischer | 260/407 |
| 3,224,893 | 12/1965 | Floyd et al. | 106/316 |
| 3,253,940 | 5/1966 | Floyd et al. | 106/316 |
| 3,776,865 | 12/1973 | Glaser et al. | 260/18 |
| 3,781,234 | 12/1973 | Drawert et al. | 260/13 |
| 4,508,868 | 4/1985 | Whyzmuzis et al. | 524/607 |
| 4,683,262 | 7/1987 | Whyzmuzis et al. | 524/608 |
| 4,722,963 | 2/1988 | Whyzmuzis | 524/606 |
| 4,820,765 | 4/1989 | Whyzmuzis | 524/606 |
| 4,971,169 | 11/1990 | Drawert et al. | 524/608 |

OTHER PUBLICATIONS

Printing Ink Vehicles, *"Encyclopedia of Polymer Science and Engineering"*, vol. 13, pp. 368–398 (John Wiley & Sons, Inc. NY, NY 1988).

Acrylic and Methacrylic Ester Polymers, *"Encyclopedia of Polymer Science and Engineering"*, vol. 1, pp. 211–299, John Wiley & Sons, NY, NY 1985.

Styrene Polymers, *"Encyclopedia of Polymer Science and Engineering"*, vol. 16, pp. 1–21, John Wiley & Sons, NY, NY 1989.1

Poehlein, Emulsion Polymerization, *"Encyclopedia of Polymer Science and Engineering"*, vol. 6, pp. 1–51, John Wiley & Sons, NY, NY 1986.

Product Data Sheet for GAX 12–513, Developmental Water Borne Polyamide, Henkel Corp., LaGrange, IL.

*Primary Examiner*—Edward J. Cain
*Attorney, Agent, or Firm*—Wayne C. Jaeschke; John Daniel Wood; Daniel S. Ortiz

[57] ABSTRACT

A method of preparing a pigment dispersion useful in the preparation of printing inks is provided. Said method comprises dispersing a pigment in an aqueous medium further comprised of a dispersing binder resin composition, said aqueous medium being essentially free of volatile organic solvents and said dispersing binder resin consisting essentially of the reaction product of a mixture of X equivalent percent of an acid component and Z equivalent percent of an amine component wherein the acid component is comprised of an aromatic dicarboxylic acid alone or in a mixture with an aliphatic dicarboxylic acid having from 2–25 carbon atoms, and said amine component is comprised of a mixture of a diamine and monoalkanol amine and the ratio of Z:X is less than 1 to provide a polyamide having an acid value greater than about 35. This invention also relates to printing inks comprising the pigment dispersion composition of this invention and a method of preparation thereof. This invention also relates to a method of printing a substrate comprising contacting a surface of a substrate with a composition comprising a printing ink as defined above and drying said surface to form a film of the solids of said ink in contact with said surface.

9 Claims, No Drawings

METHOD OF PREPARING RESIN/PIGMENT COMPOSITIONS FOR PRINTING INKS

CROSS-REFERENCE TO RELATED APPLICATIONS

This application is a continuation-in-part of U.S. Ser. No. 08/396,824, filed Mar. 2, 1995 now abandoned.

FIELD OF THE INVENTION

The present invention relates to printing inks and, in particular, to the manufacture of compositions of resin and pigment useful in flexographic and gravure printing inks.

BACKGROUND OF THE INVENTION

Flexographic/gravure inks are solvent based inks applied by rollers or pads to flexible sheets or rolls of plastic foil and paper. The practical aspects of the use of these ink resins, and inks derived therefrom, require that the polyamide resin be soluble in alcoholic solvents and such solubility be obtained without sacrificing toughness, adhesion and gloss.

The use of various polymers, including polyamides and acrylate ester polymers, as printing ink vehicles is generally discussed in "Printing Ink Vehicles", *Encyclopedia of Polymer Science and Engineering*, vol. 13, pp. 368–398 (John Wiley & Sons, Inc. N.Y., N.Y., 1988). For example, at page 389, it is shown that an acrylic emulsion is used in a water-based ink system. Another ink in the same table which is identified as water based employs ethyl alcohol as the predominant liquid component with smaller amounts of water and ammonia.

Environmental concern over the amounts of volatile organic solvents in the atmosphere has led to a desire to use aqueous solutions that have less volatile organic solvents contained therein. In order to accommodate the reduced levels of volatile organic solvents, the polyamide resins used as binders should have increased water solubility and yet retain the other desirable properties of polyamide resins such as those based on the polymeric fatty acids.

U.S. Pat. Nos. 3,253,940 and 3,224,893 illustrate the polyamide resins of polymeric fatty acids used in the past in formulations utilizing alcoholic solvents particularly ethanol in which varnishes of the polyamides in alcohol solvents were on the order of 35% by weight nonvolatile solids.

The foregoing patents provided resins which could be employed with the usual alcoholic solvents. However, as environmental solutions were sought, efforts were made to reduce emissions such as those from the volatile alcohol solvents. One means of reducing the emission was to provide water-reducible polymeric fatty acid polyamides as illustrated in U.S. Pat. No. 3,776,865. As disclosed therein, this was achieved by acid termination of the polymeric fatty acid polyamides employing an acid component of the polymeric fatty acid and another co-dicarboxylic acid and an amine component comprising isophorone diamine alone or in admixture with conventional diamines such as the alkylene diamines i.e., ethylene diamine. Acid termination was achieved by employing about 50–75 amine equivalents per 100 carboxyl equivalents. Varnishes of these resins in an alcohol solvent such as n-propanol on the order of about 40% non-volatile solids are disclosed.

Another U.S. patent, U.S. Pat. No. Re. 28,533 dealing with polymeric fatty acid polyamides employing lower aliphatic mono-basic acids such as acetic and propionic with certain amine combinations disclosed a few solubilities in ethanol up to 60% though many were 50% or below.

As environmental standards have become more and more stringent, efforts have continued to provide resins which comply with such standards. High solids varnishes on the order of 55–60%, and preferably above 60%, which are formulated into pigmented inks will meet the solvent emissions standards desired in order to reduce solvent emissions. U.S. Pat. No. 4,508,868 discloses polyamides prepared from polymeric fatty acids and diamines which include in the acid component an unsaturated fatty acid monomer and which employ relative amine and carboxyl amounts so as to provide an acid terminated product having an acid value in the range of 8–20 and preferably in the range of 10–15. Such products could be employed in alcoholic ink varnishes at levels of 60% solids or higher.

However, the polyamide resins from polymeric fatty acids, while providing acceptable properties in most instances, do not possess the desired water solubility or dispersibility when employed in inks or varnishes. Accordingly attempts have been made to improve the hardness and water solubility products which contain even lower volatile organic solvents. U.S. Pat. No. 4,683,262 was an attempt to overcome the deficiencies of the polymeric fatty acid polyamide resins. This patent discloses polyamides which are substantially free from polymeric fatty acids which have improved water solubility in their use with flexographic or gravure ink binders. While such resins provided generally acceptable products, there was still room for improvement in the hardness or non-tacky properties of the resins.

U.S. Pat. Nos. 4,722,963 and 4,820,765 disclose that further improved polyamide resins substantially free from polymeric fatty acids and useful as flexographic/gravure ink binders are provided by employing an aromatic dicarboxylic acid in the acid component. The use of the aromatic dicarboxylic acids provide resins having improved hardness or non-tacky properties while retaining the advantageous properties of the earlier resins such as those of U.S. Pat. No. 4,508,868 or U.S. Pat. No. 4,683,262 noted above. Thus, U.S. Pat. Nos. 4,722,963 and 4,820,765 provide resin compositions formed from a mixture of X equivalent percent of an acid component and Z equivalent percent of an amine component wherein the acid component is comprised of an aromatic dicarboxylic acid alone or in a mixture with an aliphatic dicarboxylic acid having from 2–25 carbon atoms, and said amine component is comprised of a diamine alone, a monoalkanol amine alone or mixtures of diamine and monoalkanol amine and the ratio of Z:X is less than 1 to provide a polyamide having an acid value greater than about 35. When said diamine is an alkylene diamine or a polyether diamine having an average molecular weight above 250 there is also present a copolymerizing acid or amine in said acid or amine component and said polyether diamine comprises in excess of 25 equivalent percent of said copolymerizing amine in said amine component. The preferred polyamides are those wherein the ratio of Z:X is less than about 0.9, more preferably ranges from 0.50 to about 0.85, and most preferably from about 0.65 to about 0.85.

SUMMARY OF THE INVENTION

This invention relates to a method of preparing a pigment dispersion useful in the preparation of printing inks, said method comprising dispersing a pigment in an aqueous medium further comprised of a dispersing binder resin composition, said aqueous medium being essentially free of volatile organic solvents and said dispersing binder resin consisting essentially of the reaction product of a mixture of X equivalent percent of an acid component and Z equivalent percent of an amine component wherein the acid component is comprised of an aromatic dicarboxylic acid alone or in a mixture with an aliphatic dicarboxylic acid having from 2–25 carbon atoms, and said amine component is comprised of a mixture of a diamine and monoalkanol amine and the ratio of Z:X is less than 1 to provide a polyamide having an acid value greater than about 35.

This invention also relates to printing inks comprising the pigment dispersion composition of this invention and a method of preparation thereof. The method of preparation of printing inks comprising letting down a pigment dispersion of this invention with an aqueous composition comprised of a binder resin and being essentially free of volatile organic solvents. In certain embodiments, the binder resin in the aqueous composition is a polyamide resin identical or similar to the dispersing binder resin. In other embodiments, the aqueous composition is an acrylic emulsion, e.g. a water dispersible acrylate resin prepared by the suspension polymerization of one or more monomers selected from the group consisting of alkyl acrylates, alkyl methacrylates, and mixtures of a major amount by weight of an alkyl acrylate or alkyl methacrylate with a minor amount by weight of one or more copolymerizable comonomers, in the presence of a support resin.

This invention also relates to a method of printing a substrate comprising contacting a surface of a substrate with a composition comprising a printing ink as defined above and drying said surface to form a film of the solids of said ink in contact with said surface.

DETAILED DESCRIPTION OF THE INVENTION

In one aspect, this invention relates to a method of preparing a pigment dispersion useful in the preparation of printing inks. The method in its broadest conception comprises dispersing a pigment in an aqueous medium further comprised of a dispersing binder resin composition, said aqueous medium being essentially free of volatile organic solvents.

The dispersing binder resin consists essentially of the reaction product of a mixture of X equivalent percent of an acid component and Z equivalent percent of an amine component wherein the acid component is comprised of an aromatic dicarboxylic acid alone or in a mixture with an aliphatic dicarboxylic acid having from 2–25 carbon atoms, and said amine component is comprised of a mixture of a diamine and monoalkanol amine and the ratio of Z:X is less than 1 to provide a polyamide having an acid value greater than about 35. The dispersing binder resin is thus a polyamide resin.

The polyamide resins useful in the present invention are prepared by polymerizing a mixture of the amine component and the acid component. The resins are acid terminated resins in that an excess of dicarboxylic acids are used in relation to the amine component reactants. If a mono-basic acid is desired to be used as a chain-stopper, such should be employed in limited, or very small amounts (less than 10, and preferably less than 5 equivalent percent), as their presence can adversely affect the properties of the polyamide resin. The ratio of equivalents of the amine component to the equivalents of acid component is less than 1, preferably less than about 0.9, more preferably ranges from 0.50 to about 0.85, and most preferably about 0.65 to 0.85. In considering the equivalents of the amine component, it is necessary to take into consideration the hydroxyl group of the alkanolamine which is also reactive with the carboxyl groups of the acid component and which results in a polyester-amide, i.e. a polyamide also containing ester groups. Accordingly, where reference is made to the equivalents of the amine component, it is understood that both the hydroxyl and amine equivalents of the amine component are considered.

As indicated earlier in the polyamide resins of this invention, an aromatic dicarboxylic acid is employed either alone or in admixture with copolymerizing aliphatic dicarboxylic acids. In general, the aromatic dicarboxylic acid which are employed will contain from 8–16 carbon atoms. Such acids include phthalic, isophthalic, and terephthalic, and diphenic and naphthalene dicarboxylic acids, isophthalic and terephthalic being the preferred acids.

The aliphatic dicarboxylic acids which may be employed along with the aromatic diacid are those having from 2–25 carbon atoms with the longer-chain acids, i.e., from 13 and above, with the 16–21 carbon atom acids being the most desirable. The dicarboxylic acids include not only the straight-chain aliphatic acids, but also include those having branched alkyl chains and alicyclic structures in the molecule as well. Accordingly, the dicarboxylic acids include the usual shorter-chain acids beginning with ethanedioic and the usual aliphatic dicarboxylic acids such as azelaic, adipic and sebacic acid: The class also includes longer-chain dicarboxylic acids such as heptadecane dicarboxylic acid (a C19 acid) and acids obtained by the Diels-Alder reaction products of acrylic acid with a fatty acid having conjugated ethylenic unsaturation such as 2-n-hexyl-5-(7-carboxyl-n-heptyl)-cyclohex-3-ene (a C21 diacid) carboxylic acid which is available from Westvaco, Charleston Heights, S.C. as Westvaco diacid. Heptadecane dicarboxylic acids are well known and prepared via the known process of carboxylation of oleic acid. References to these acids are made in U.S. Pat. No. 3,781,234 which in turn makes reference to German Pat. No. 1,006,849 for the preparation of the 1,8-or 1,9-heptadecane dicarboxylic acid.

As indicated, the aromatic dicarboxylic acid is employed alone or in a mixture with the aliphatic dicarboxylic acids. Where employed, the aliphatic dicarboxylic acid may be employed in an amount up to about 50 equivalent percent of the acid component, or a ratio of equivalents of aromatic to aliphatic dicarboxylic acid of 1:1. Stated another way, the acid component may accordingly be comprised of (a) 50–100 equivalent percent of the aromatic dicarboxylic acid and (b) 0–50 equivalent percent of the aliphatic dicarboxylic acid.

As earlier noted, the polyamides of this invention are prepared from mixtures that are substantially free of polymeric fatty acids. These polymeric fatty acids, which can be characterized as long-chain polybasic acids, are described in U.S. Pat. No. 3,776,865 and U.S. Pat. No. 3,157,681. These polymeric fatty acids are derived by polymerizing unsaturated fatty acids. If necessary to modify the resins of the present invention, such polymeric fatty acids may be used in very small amounts, i.e. up to about 5 equivalent percent. Preferably no polymeric fatty acid should be employed.

The diamines used to form the polyamide resins of this invention may be aromatic or aliphatic, cyclic and heterocyclic. Preferably, the amine component contains at least one aliphatic diamine having 2–25 aliphatic carbon atoms or an akanolamine such as discussed below. The preferred diamines can be divided into various preferred groups, mixtures of which may be employed. In the aromatic or heterocyclic group amines such as piperazine and xylylene diamine may be employed. In the cycloaliphatic group, cyclic aliphatic diamines having from 8–12 aliphatic carbon atoms, e.g., isophorone diamine may be employed. Another preferred group is comprised of shod-chain alkylene diamines which can be represented by the formula: $H_2N-R-NH_2$, wherein R is an alkylene radical having from 2–8 carbon atoms. R may be branched or straight-chain, the straight-chain radicals being preferred. Specific examples of short-chain alkylene diamines are ethylene diamine, diaminopropane, diaminobutane, and hexamethylene diamine. Another group is the shod chain polyether diamines which are commercially available, which may be defined by the formula:

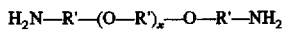

where R' is an alkylene group containing 2–6 carbon atoms, preferably an ethylene or isopropylene group and x is an integer of 0–5, preferably 1 or 2, such that an average molecular weight not more than about 400 and preferably less than about 250. Commercially available polyether diamines are Jeffamine D-230 and 400 described by the supplier as polyoxypropylene diamine.

The monoalkanolamines which may be employed alone or in admixture with the aromatic, aliphatic or heterocyclic diamines in this invention are those containing 2–6 carbon atoms, straight or branched-chain, which may be represented by the formula: $OH-R''-NH_2$ wherein R" is an alkylene radical having from 2–6 carbon atoms. Specific examples of short-chain monoalkanolamines are ethanolamine, propanolamine, and butanolamine, with the ethanol and propanolamine products being preferred. The resins are prepared from mixtures of a dicarboxylic acid component and an amine component by known methods for the polymerization of diacids and diamines to form polyamides. In general, a mixture of the diacid component and the amine component is heated to a temperature of between 100°–250° C. in a vessel equipped for the removal of the by-product water formed in the amidification reaction; e.g., a vessel fitted with a distillation column and condenser so as to remove water from the reaction zone.

Typically, the reaction mixture will be heated at lower temperatures initially to avoid any volatilization and loss of any reactant which may be employed, after which the temperature is raised to a higher reaction temperature. Thus, it is common to heat at a temperature of about 140° C. for about 1 hour followed by raising the temperature to about 210°–250° C. and reacting for 1.0–3.0 hours, preferably with the last hour under vacuum.

The degree of polymerization of the mixture is controlled, along with a choice of ratio of amine:acid, to provide a polyamide having a high acid value. The acid value of the polyamide should be greater than about 35, more preferably greater than 50, i.e. between 50 to about 250, dependent on the particular amine and acid formulation.

The amount of the dispersing resin binder in the pigment dispersion may vary widely depending upon the precise characteristics desired of the pigment dispersion and the inks prepared therefrom. Typically, the dispersing binder resin will be present in the pigment dispersion in an amount of from about 5% to about 50% by weight, more typically from about 10% to about 25% by weight, of the total weight of the pigment dispersion.

The polyamide resins of this invention form the binder compositions of this invention when dissolved in an aqueous solvent containing ammonia or an organic amine. The resin is added to the solvent in an amount of about 30–40% resin solids based on the weight of the solvent. Typically, the aqueous solvent will contain only ammonia, but examples of suitable Organic amines that can be used in place of or with ammonia include primary, secondary, and tertiary amines which can act as a base to salt the acid terminated polyamides. Specific examples of organic amines are the dialkyl aminoalkanols such as 2-(N,N-dimethylamino)ethanol and 2-(N,N-diethylamino)ethanol.

The ammonia or organic amine is present in the aqueous solution in an amount sufficient to solubilize the chosen polyamide resin. In general, the ammonia or organic amine will be present in the aqueous solution in an amount sufficient to theoretically neutralize the acid groups of the polyamide, i.e., the amount of ammonia or organic amine is stoichiometrically equivalent to or greater than the acid value of the polyamide. For example, a 7.4% solution of dimethylaminoethanol is stoichiometrically equivalent to a polyamide resin having an acid value of about 70 used at a level of about 40% resin solids. A large excess of organic amine should be avoided because retention of the organic amine in the cured binder may adversely affect the water resistance of the binder.

The dispersion will typically be otherwise essentially free of organic solvents, e.g. alcohol solvents such as the short chain aliphatic alcohols having from 2 to 4 carbon atoms, e.g. the lower alkanols, ethanol, n-propanol, isopropanol and n-butanol. These solvents can contribute to the volatile organic content (a.k.a. VOC) of the dispersion and any ink prepared therefrom which has environmental disadvantages.

These binders are particularly useful in flexographic/ gravure ink compositions. The resins may also be useful in other coating compositions where harder, non-tacky products are desired or in the cases of softer, somewhat tacky products, in bonding two flexible substrates where adhesion to each substrate is desirable. Where employed in ink compositions, the inks are prepared by dispersing a flexographic/gravure ink pigment in the binder compositions of the invention.

Thus, another ingredient of the printing ink of this invention is the pigment or colorant. The generic term "colorant pigment" is specifically used in this specification in that it is intended to refer to both pigments and dyes which impart a distinct color (i.e. a hue as opposed to white (the absence of color) or black and/or shades of gray) to the composition. The purpose of any colorant is to provide contrast between the color of the substrate and the color of ink in order to provide a visually identifiable indicia on the substrate.

The pigment of the dispersion will typically be a colorant pigment, i.e. the pigment will impart a color to the pigment dispersion, to a printing ink prepared therefrom, and to the surface of a substrate printed with such an printing ink. The colorant pigments useful in this invention will typically include black, organic red, organic yellow, inorganic red, inorganic yellow, and organic blue as well as violet, orange, green, brown and other hues of organic yellow and red. Useful pigments include for instance ferrite yellow oxide, red iron oxides, ferric iron oxide brown (which is a blend of red, yellow, and black iron oxides), tan oxide (which is a similar blend), raw sienna and burnt sienna, raw and burnt umber, copper phthalo cyanine green and blue, DNA orange (dinitroaniline orange #5), carbon black, lampblack, toluidine red, parachlor red, (burnt red and maroon red) hansa yellows which are azo coupling of metapara nitrotoluidiene and quinacridone red, magenta and violet.

The pigment may be any of those which are typically used in flexographic inks such as monoazo yellows (e.g. CI Pigment Yellows 3, 5, 98); diarylide yellows (e.g. CI Pigment Yellows 12, 13, 14); Pyrazolone Orange, Permanent Red 2G, Lithol Rubine 4B, Rubine 2B, Red Lake C, Lithol Red, Permanent Red R, Phthalocyanine Green, Phthalocyanine Blue, Permanent Violet, titanium dioxide, carbon black, etc.

Opacifying pigments can be added to the colorant pigment dispersions of this invention. For purposes of this invention, white opacifying pigments are not considered to be colorant pigments. Opacifying pigments are generally pigments having a refractive index of at least about 1.8. Typical white opacifying pigments include rutile and anatase titanium dioxide.

The dispersions can further contain non-opacifying filler or extender pigments often referred to in the art as inerts and include clays, such as kaolinite clays, silica, talc, mica, barytes, calcium carbonate, and other conventional filler pigments. All filler or extender pigments have fairly low refractive indices and can be described generally as pigment other than opacifying pigment.

The pigment dispersions of this invention may contain filler/extender pigments as well as the colorant pigments to provide an aqueous dispersion having a total PVC (pigment volume content) as desired. The PVC will typically be between about 5% and 60%.

The pigment dispersions of this invention may be prepared as follows. The pigment is mixed with a solution of the binder resin and, at a properly adjusted viscosity, dispersed thereinto with ball mill, sand mill, high-shear fluid flow mill, Cowles Dissolver, Katy Mill or the like. The process of dispersing deagglomerates the pigment particles and the dispersing binder resin causes the deagglomerated particles of pigment to be wetted with the aqueous solution. This wetting thus inhibits the reagglomeration of the pigment particles.

This invention also relates to printing inks comprising the pigment dispersion composition of this invention and a method of preparation thereof. The method of preparation of printing inks comprises letting down a pigment dispersion of this invention with an aqueous composition comprised of a binder resin and being essentially free of volatile organic solvents. The inks will typically be comprised of amounts of pigment dispersion and let down composition that are roughly equal, i.e. weight ratio of from about 2:1 to about 1:2. Further, the let down composition will typically be comprised of a major amount (i.e. at least 50% by weight) of water and a minor amount of resin solids (e.g. at least about 5% by weight, more typically from about 10 to about 40%, and even more typically from about 20 to about 35%). The let down composition will also typically be essentially free of volatile organic solvents. Thus, also provided by this invention is a printing ink comprising an essentially aqueous solvent, the resin binder, and a colorant pigment distributed through the composition in an effective amount sufficient to impart a predetermined color to the resulting printing ink composition, said composition being essentially free of volatile organic solvents.

In certain embodiments, the binder resin in the aqueous composition is a polyamide resin identical or similar to the dispersing binder resin. In other embodiments, the aqueous composition is an acrylic emulsion, e.g. a water dispersible acrylate resin prepared by the suspension polymerization of one or more monomers selected from the group consisting of alkyl acrylates, alkyl methacrylates, and mixtures of a major amount by weight of an alkyl acrylate or alkyl methacrylate with a minor amount by weight of one or more copolymerizable comonomers, in the presence of a support resin.

Thus, the printing inks of this invention may also contain, as a binder resin, an acrylate polymer. These polymers have repeating units derived from esters of acrylic acid and methacrylic acid. Such esters are described in "Acrylic and Methacrylic Ester Polymers", *Encyclopedia of Polymer Science and Engineering*, vol. 1, pp. 234–299 (John Wiley & Sons, Inc., N.Y., N.Y., 1985), the disclosure of which is incorporated herein by reference. The polymer may also have repeating units derived from other monomers including, without limitation, ethylenically unsaturated carboxylic acids and vinyl aromatic monomer. Vinyl aromatic compounds are discussed in "Styrene Polymers" *Encyclopedia of Polymer Science and Engineering*, vol. 16, pp. 1–21 (John Wiley & Sons, Inc., N.Y., N.Y., 1989) and examples of such acids are described in "Acrylic and Methacrylic Acid Polymers", *Encyclopedia of Polymer Science and Engineering*, vol. 1, pp. 211–234 (John Wiley & Sons, Inc., N.Y., N.Y., 1985), the disclosures of which are incorporated herein by reference.

Examples of acrylates and methacrylates that should be useful include methyl, ethyl, n-propyl, isopropyl, n-butyl, isobutyl, sec-butyl, n-amyl, isoamyl, t-amyl, n-hexyl, 2-ethylbutyl, cyclohexyl, 2-heptyl, n-octyl, 2-ethylhexyl, n-decyl, and n-undecyl. A potential utility of such monomers is the ability of one of ordinary skill, in possession of this disclosure, to use such monomers to optimize the softness of the polymer. Thus, one measure of their utility will depend upon the desired degree of softness of the polymer which, in turn, depends at least in part, on the identity and amounts of the other monomeric units. A measure of the softening or plasticizing effect of a monomer can be found by examining the glass transition temperature of a homopolymer of the monomer. Generally, a plasticizing monomer will be such that a homopolymer of the monomer will exhibit a glass transition temperature ($T_g$) of less than about −30° C. Thus, acrylates of a straight chain alkyl having from 3 to 11 carbon atoms or a branched chain alkyl having from 5 to 11 carbon atoms may generally be useful for plasticizing the polymer. Because of the relatively high $T_g$ of poly(t-butyl acrylate), the use of a monomer t-butyl acrylate is unlikely to be advantageous.

Vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene.

Further, while the preferred alkyl acrylates and methacrylates described above are preferably employed without additional comonomers for preparing ink vehicles of this invention, other monoethylenically unsaturated polymerizable monomers useful in minor proportion (e.g. less than 10% by weight of the total monomer composition) as comonomers with acrylic monomers may be useful in preparing the polymers of this invention, particularly for uses other than in ink vehicles. These monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$ alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like.

Additional monoethylenically unsaturated polymerizable comonomers that may be useful in preparing the polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the polymer.

Examples of alpha, beta-ethylenically unsaturated carboxylic acids which may also be useful as comonomers to prepare the polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof.

The preparation of aqueous dispersions of polymers by emulsion polymerization for use in coatings applications is well known in the art. The practice of emulsion polymerization is discussed in detail in G. Poehlein, "Emulsion Polymerization", *Encyclopedia of Polymer Science and Technology*, vol. 6, pp. 1–51 (John Wiley & Sons, Inc. N.Y., N.Y., 1986), the disclosure of which is incorporated herein by reference. Conventional emulsion polymerization techniques may be used to prepare the aqueous dispersion of polymers of this invention.

Thus, monomers may be emulsified with an anionic, cationic or nonionic dispersing agent, using for example from about 0.05% to 10% by weight of dispersing agent on the weight of total monomers. Combinations of anionic and nonionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid. Cationic dispersion agents include lauryl-pyridinium chlorides, cetyldimethyl amine acetate, and alkyldimethylbenzylammonium chlorides in which the alkyl group has from 8 to 18 carbon atoms. Anionic dispersing agents include, for example, the higher fatty alcohol sulfates, such as sodium lauryl sulfate, and the like; alkylaryl sulfonates such as sodium or potassium isopropylbenzene sulfonates or isopropyl naphthalene sulfonates, and the like; alkali metal higher alkyl sulfosuccinates, such as sodium octyl sulfosuccinate, sodium N-methyl-N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analogous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

In addition to the emulsifiers set forth above, the emulsion may contain one or more suspending aids. Preferred compositions contain an acrylic resin having a substantial acid number as a suspending aid. Such resins become and contribute to the polymer film prepared from the emulsion, but do not have acceptable properties by themselves.

Preferred carboxylate polymers are vinyl aromatic/acrylic copolymers (e.g. styrene/acrylic copolymers) having a substantial acid number (typically 150–250, and preferably 180–220) and a moderate molecular weight (e.g. 6,000 to 10,000). Vinyl aromatic compounds are discussed in "Styrene Polymers" *Encyclopedia of Polymer Science and Engineering*, vol. 16, pp. 1–21 (John Wiley & Sons, Inc., N.Y., N.Y., 1989), the disclosure of which is incorporated herein by reference. The vinyl aromatic compounds comprise monovinyl aromatic hydrocarbons containing from 8 to 12 carbon atoms and halogenated derivatives thereof having halo-substituted aromatic moieties. Examples include styrene, alpha-methylstyrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene. At least a portion of the acrylic units of the polymer will bear free carboxyl or carboxylate groups (the carboxyl or carboxylate form depending upon the pH of the aqueous emulsion). This carboxylate functionality is solvated by the aqueous polymerization medium and, thus, contributes to the stability of the polymer suspension. The aqueous composition should be essentially free of species which can react with or form a complex with such carboxylate functionality. Such freedom will ensure that the carboxylate functionality remains solvated by the aqueous polymerization medium and/or that the carboxylate polymer will not engage in measurable crosslinking, either in the aqueous polymerization medium or the films prepared therewith. Also, emulsion stabilizers, i.e. water soluble polymers such as water-soluble polyalkylene oxides, may be useful. A preferred emulsion stabilizer is a polypropylene glycol having a molecular weight in the range of 1,000 to 1,500.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or more, and may be optimized for the catalyst system employed, as is conventional. Emulsion polymerization may be seeded or unseeded. Seeded polymerization is preferred and tends to yield aqueous dispersions of latex polymer having more uniform physical properties than unseeded polymerization.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichlorobromoethane. Generally from about 0 to 3% by weight, based on the weight of the monomer mixture, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be chased (e.g. with t-butyl hydroperoxide and or sodium ascorbate) to minimize the concentrations of unreacted monomer and unreacted polymerization catalyst species. The pH of the contents of the reaction vessel may also be altered during the course of the emulsion polymerization process. Both thermal and redox polymerization processes may be employed.

The ink compositions of the present invention in their broadest conception are not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system. The viscosity and printing characteristics of the ink composition may be modified further by addition of water, solvents, plasticizers, sequestered wax, surfactants and the like to suit the particular printing needs.

The printing processes most advantageously used with the inks or varnishes are gravure printing processes. One characteristic of such printing processes, is that the aqueous dispersion of ink fills recesses in a printing plate and is applied to one side or surface of the substrate to be printed by the application of pressure to the reverse side of the substrate which causes the first surface of the substrate to contact the ink and thereby take up the ink in the recesses. Printing processes are described by T. Sulzberg et al., "Printing Ink Vehicles", *Encyclopedia of Polymer Science and Engineering*, vol. 13, pp. 368–398 (John Wiley & Sons, Inc., N.Y, N.Y., 1988), the disclosure of which is incorporated herein by reference. Thus, this invention relates to a method of printing comprising applying an aqueous printing ink of this invention to a first essentially impervious printing surface, said surface having recesses therein which define a resolvable image and which carry said aqueous printing ink, contacting a first surface of a printable substrate with said first essentially impervious printing surface by applying pressure to a reverse surface of said printable substrate. In typical embodiments, a continuous web (typically of a non-woven cellulosic material) of substrate is fed to a rotary press at high speeds, e.g. 450 to 650 meters/min.

The substrate to be printed may be chosen from a wide variety of flexible materials. The printing inks are particularly suited for the printing of paper and paperboard, for example, newsprint. This invention is not limited to the printing of paper substrates, however, and thus, suitable substrates also include films of polyethylene and polypropylene; polyester such as polyethylene terephthalate, cellophane and polyamide which may or may not be coated with PVDC for improved barrier properties; corona treated polypropylene or polyethylene or PVDC coated cellophane or PVDC coated polyester; woven and non-woven fabrics where the fibers are of cotton, polyester, polyolefin, polyamide, polyimide and the like; metallic foils such as aluminum foil; metallized films; and cellular flexible sheet material such as polyethylene foam, polyurethane foam and sponge and foam rubber.

The following examples will serve to further illustrate the invention, but should not be construed to limit the invention, unless expressly set forth in the appended claims. All parts, percentages, and ratios are by weight unless otherwise indicated in context.

EXAMPLES

RESIN PREPARATION

The polyamide resins can be prepared by charging the acid and amine reactants to a vacuum reactor (suitable for a vacuum of about 40 mm of Hg) along with about 1% of an 85% solution of phosphoric acid as a catalyst. The reaction mixture is gradually heated to 210° to 250° C. and held for 1 to 2.5 hours at that temperature. Further, in the examples the terms, abbreviations and symbols have the following meanings: D-230 is Jeffamine D-230-Polypropylene Diamine available from Texaco Chemical Company having molecular weight about 230; D-400 is Jeffamine D400-Polypropylene Diamine having molecular weight of about 400; and $C_{21}$ diacid is Westvaco $C_{21}$ Diacid, 2-n-hexyl-5-(7-carboxyl-n-heptyl)-cyclohexo-3-ene carboxylic acid.

PIGMENT DISPERSION AND BLACK INK PREPARATION

A sample of the polyamide resin (198 parts by weight) is dissolved in a mixture of 369.6 parts by weight of water and 32.4 parts by weight of aqueous ammonia (28%). Then 69 parts by weight of the resulting solution is mixed with 37.5 parts by weight of carbon black 0.75 parts by weight of an anti-foam agent, 21 parts by weight of water. To this mixture is added 200 parts by weight of steel shot and the entire mixture is sealed in a secure vessel and agitated at high speed for 2 hours (using a commercial paint shaker). A sample of the resulting pigment dispersion is let down by mixing with 20 parts by weight of an acrylic emulsion, available from Henkel Corp., LaGrange, Ill. as G-Cryl 2000, or 20 parts by weight of the solution of polyamide resin first set forth above, along with 5 parts by weight of water and 5 parts by weight of a wax.

PIGMENT DISPERSION AND BLUE INK PREPARATION

A sample of the polyamide resin (198 parts by weight) is dissolved in a mixture of 369.6 parts by weight of water and 32.4 parts by weight of aqueous ammonia (28%). Then 69 parts by weight of the resulting solution is mixed with 37.5 parts by weight of carbon black 0.75 parts by weight of an anti-foam agent, 55 parts by weight of water and 1 pad by weight of isopropanol. To this mixture is added 200 parts by weight of steel shot and the entire mixture is sealed in a secure vessel and agitated at high speed for 2 hours (using a commercial paint shaker). A sample of the resulting pigment dispersion is let down by mixing with 20 parts by weight of an acrylic emulsion, available from Henkel Corp., LaGrange, Ill. as G-Cryl 2000, or 20 pads by weight of the solution of polyamide resin first set forth above, along with 5 pads by weight of water and 5 parts by weight of a wax.

Example 1

A polyamide resin is prepared from a mixture as follows: 100 eq. isophthalic acid, 41.7 eq. ethylenediamine, and 41.6 eq. monoethanolamine. A black ink and a blue ink are prepared as set forth above.

Example 2

A polyamide resin is prepared from a mixture as follows: 100 eq. isophthalic acid, 62.5 eq. ethylenediamine, and 3.5 eq. monoethanolamine. A black ink and a blue ink are prepared as set forth above.

Example 3

A polyamide resin is prepared from a mixture as follows: 100 eq. isophthalic acid, 36.5 eq. ethylenediamine, and 36.5 eq. monoethanolamine. A black ink and a blue ink are prepared as set forth above.

Example 4

A polyamide resin is prepared from a mixture as follows: 100 eq. isophthalic acid, 76.3 eq. ethylenediamine, and 12.5 eq. monoethanolamine. A black ink and a blue ink are prepared as set forth above.

Example 5

A polyamide resin is prepared from a mixture as follows: 75 eq. isophthalic acid, 25 eq. of $C_{21}$ diacid, 36.5 eq. ethylenediamine, and 36.5 eq. monoethanolamine. A black ink and a blue ink are prepared as set forth above.

Example 6

A polyamide resin is prepared from a mixture as follows: 75 eq. isophthalic acid, 25 eq. of $C_{21}$ diacid, 16.2 eq. ethylenediamine, and 58.7 eq. monoethanolamine. A black ink and a blue ink are prepared as set forth above.

Example 7

A polyamide resin is prepared from a mixture as follows: 75 eq. isophthalic acid, 25 eq. of $C_{21}$ diacid, and 77 eq. ethylenediamine. A black ink and a blue ink are prepared as set forth above.

Example 8

A polyamide resin is prepared from a mixture as follows: 75 eq. isophthalic acid, 25 eq. of $C_{21}$ diacid, 34.7 ethylenediamine, and 22.1 hexamethylenediamine. A black ink and a blue ink are prepared as set forth above.

Example 9

A polyamide resin is prepared from a mixture as follows: 100 eq. isophthalic acid and 70.7 eq. D-230. A black ink and a blue ink are prepared as set forth above.

Example 10

A polyamide resin is prepared from a mixture as follows: 100 eq. isophthalic acid, and 83.3 eq. monoethanolamine, A black ink and a blue ink are prepared as set forth above.

Example 11

A polyamide resin is prepared from a mixture as follows: 100 eq. isophthalic acid, and 91.6 eq. monoethanolamine. A black ink and a blue ink are prepared as set forth above.

Example 12

A polyamide resin is prepared from a mixture as follows: 100 eq. isophthalic acid, and 70.7 eq. D-400. A black ink and a blue ink are prepared as set forth above.

Example 13

A polyamide resin is prepared from a mixture as follows: 67.5 eq. isophthalic acid, 32.5 eq. of $C_{21}$ diacid, 62.5 eq. ethylenediamine, and 7.1 eq. of hexamethylenediamine. A black ink and a blue ink are prepared as set forth above.

Example 14

A polyamide resin is prepared from a mixture as follows: 65 eq. isophthalic acid, 35 eq. of $C_{21}$ diacid, and 74.5 eq. ethylenediamine. A black ink and a blue ink are prepared as set forth above.

Example 15

A polyamide resin is prepared from a mixture as follows: 65 eq. isophthalic acid, 35 eq. of $C_{21}$ diacid, and 58.2 eq. monoethanolamine, and 5.3 hexamethylenediamine. A black ink and a blue ink are prepared as set forth above.

Example 16

A polyamide resin is prepared from a mixture as follows: 75 eq. isophthalic acid, 25 eq. of $C_{21}$ diacid, and 77 eq. monoethanolamine. A black ink and a blue ink are prepared as set forth above.

Example 17

A polyamide resin is prepared from a mixture as follows: 75 eq. isophthalic acid, 25 eq. of $C_{21}$ diacid, 51.5 eq. ethylenediamine, and 34.3 eq. D-230. A black ink and a blue ink are prepared as set forth above.

Example 18

A polyamide resin is prepared from a mixture as follows: 50 eq. isophthalic acid, 50 eq. of $C_{21}$ diacid, and 91 eq. ethylenediamine. A black ink and a blue ink are prepared as set forth above.

Example 19

A polyamide resin is prepared from a mixture as follows: 75 eq. isophthalic acid, 25 eq. of $C_{21}$ diacid, 4.3 eq. ethylenediamine, and 74.1 monoethanolamine. A black ink and a blue ink are prepared as set forth above.

Example 20

A polyamide resin is prepared from a mixture as follows: 50 eq. isophthalic acid, 50 eq. of $C_{21}$ diacid, and 68 eq. ethylenediamine. A black ink and a blue ink are prepared as set forth above.

Example 21

A polyamide resin is prepared from a mixture as follows: 100 eq. isophthalic acid and 88.5 eq. D-230. A black ink and a blue ink are prepared as set forth above.

Example 22

A polyamide resin is prepared from a mixture as follows: 67.55 eq. isophthalic acid, 32.5 eq. of $C_{21}$ diacid, and 68 eq. monoethanolamine. A black ink and a blue ink are prepared as set forth above.

Example 23

A polyamide resin is prepared from a mixture as follows: 65 eq. isophthalic add, 35 eq. of $C_{21}$ diacid, 61.8 eq. monoethanolamine, and 5.7 D-230. A black ink and a blue ink are prepared as set forth above.

Example 24

A polyamide resin is prepared from a mixture as follows: 87.5 eq. isophthalic acid, 12.5 eq. of $C_{21}$ diacid, and 91 eq. monoethanolamine. A black ink and a blue ink are prepared as set forth above.

Example 25

A polyamide resin is prepared from a mixture as follows: 87.5 eq. isophthalic acid, 12.5 eq. of $C_{21}$ diacid, 52.1 eq. ethylenediamine, and 14.1 eq. hexamethylenediamine. A black ink and a blue ink are prepared as set forth above.

Example 26

A polyamide resin is prepared from a mixture as follows: 87.5 eq. isophthalic acid, 12.5 eq. of $C_{21}$ diacid, and 80.2 eq. monoethanolamine. A black ink and a blue ink are prepared as set forth above.

Example 27

A polyamide resin is prepared from a mixture as follows: 87.5 eq. isophthalic acid, 12.5 eq. of $C_{21}$ diacid, and 80.2 eq. ethylenediamine. A black ink and a blue ink are prepared as set forth above.

Example 28

A polyamide resin is prepared from a mixture as follows: 87.5 eq. isophthalic acid, 12.5 eq. of $C_{21}$ diacid, and 70 eq. monoethanolamine. A black ink and a blue ink are prepared as set forth above.

Example 29

A polyamide resin is prepared from a mixture as follows: 87.5 eq. isophthalic acid, 12.5 eq. of $C_{21}$ diacid, and 91 eq. hexamethylenediamine. A black ink and a blue ink are prepared as set forth above.

Example 30

A polyamide resin is prepared from a mixture as follows: 87.5 eq. isophthalic acid, 12.5 eq. of $C_{21}$ diacid, and 72 eq. ethylenediamine. A black ink and a blue ink are prepared as set forth above.

Example 31

A polyamide resin is prepared from a mixture as follows: 50 eq. isophthalic acid, 50 eq. of $C_{21}$ diacid, and 91 eq. hexamethylenediamine. A black ink and a blue ink are prepared as set forth above.

Example 32

A polyamide resin as prepared from a mixture as follows: 65 eq. isophthalic acid, 35 eq. of $C_{21}$ diacid, and 65 eq. hexamethylenediamine. A black ink and a blue ink are prepared as set forth above.

Example 33

A polyamide resin is prepared from a mixture as follows: 87.5 eq. isophthalic acid, 12.5 eq. of $C_{21}$ diacid, and 91 eq. hexamethylenediamine. A black ink and a blue ink are prepared as set forth above.

Example 34

A polyamide resin is prepared from a mixture as follows: 87.5 eq. isophthalic acid, 12.5 eq. of $C_{21}$ diacid, 65 eq. ethylenediamine, and 5 eq. hexamethylenediamine. A black ink and a blue ink are prepared as set forth above.

Example 35

A polyamide resin is prepared from a mixture as follows: 87.5 eq. isophthalic acid, 12.5 eq. of $C_{21}$ diacid, 55 eq. ethylenediamine and 20 eq. hexamethylenediamine. A black ink and a blue ink are prepared as set forth above.

Example 36

A polyamide resin is prepared from a mixture as follows: 50 eq. isophthalic acid, 50 eq. of $C_{21}$ diacid, 63 eq. monoethanolamine, and 13 eq. hexamethylenediamine. A black ink and a blue ink are prepared as set forth above.

Example 37

A polyamide resin is prepared from a mixture as follows: 87.5 eq. isophthalic acid, 12.5 eq. of $C_{21}$ diacid, 59 eq. ethylenediamine, and 17 eq. monoethanolamine. A black ink and a blue ink are prepared as set forth above.

Example 38

A polyamide resin is prepared from a mixture as follows: 67.5 eq. isophthalic acid, 32.5 eq. of $C_{21}$ diacid, 66.5 eq. monoethanolamine, and 3.5 eq. hexamethylenediamine. A black ink and a blue ink are prepared as set forth above.

Example 39

A polyamide resin is prepared from a mixture as follows: 50 eq. isophthalic acid, 50 eq. of $C_{21}$ diacid, 59 eq. ethylenediamine, and 17 eq. monoethanolamine. A black ink and a blue ink are prepared as set forth above.

Example 40

A polyamide resin is prepared from a mixture as follows: 50 eq. isophthalic acid, 50 eq. of $C_{21}$ diacid, and 70.7 eq. ethylenediamine. A black ink and a blue ink are prepared as set forth above.

Example 41

A polyamide resin is prepared from a mixture as follows: 100 eq. isophthalic acid, 61.8 eq. monoethanolamine, and 20.6 hexamethylenediamine. A black ink and a blue ink are prepared as set forth above.

Example 42

A polyamide resin is prepared from a mixture as follows: 100 eq. isophthalic acid, 44.2 eq. ethylenediamine, and 29.5 eq. D-230. A black ink and a blue ink are prepared as set forth above.

Example 43

A polyamide resin is prepared from a mixture as follows: 100 eq. isophthalic acid, 23.5 eq. ethylenediamine, and 23.5 eq. monoethanolamine. A black ink and a blue ink are prepared as set forth above.

Example 44

A polyamide resin is prepared from a mixture as follows: 100 eq. isophthalic acid, 74.2 eq. ethylenediamine, and 1.5 eq. monoethanolamine. A black ink and a blue ink are prepared as set forth above.

Example 45

A polyamide resin is prepared from a mixture as follows: 100 eq. isophthalic acid, 45.8 eq. ethylenediamine, and 45.8 eq. monoethanolamine. A black ink and a blue ink are prepared as set forth above.

Example 46

A polyamide resin is prepared from a mixture as follows: 75 eq. isophthalic acid, 25 eq. of $C_{21}$ diacid, 52.1 eq. ethylenediamine, and 18.5 eq. monoethanolamine. A black ink and a blue ink are prepared as set forth above.

Example 47

A polyamide resin is prepared from a mixture as follows: 75 eq. isophthalic acid, 25 eq. of $C_{21}$ diacid, 23.5 eq. ethylenediamine, and 23.5 eq. monoethanolamine. A black ink and a blue ink are prepared as set forth above.

Example 48

A polyamide resin is prepared from a mixture as follows: 100 eq. isophthalic acid and 88.5 eq. D-230. A black ink and a blue ink are prepared as set forth above.

Example 49

A polyamide resin is prepared from a mixture as follows: 75 eq. isophthalic acid, 25 eq. of $C_{21}$ diacid, and 60 eq. ethylenediamine. A black ink and a blue ink are prepared as set forth above.

Example 50

A polyamide resin is prepared from a mixture as follows: 75 eq. isophthalic acid, 25 eq. of $C_{21}$ diacid, 57.7 eq. monoethanolamine, and 21.4 hexamethylenediamine. A black ink and a blue ink are prepared as set forth above.

Example 51

A polyamide resin is prepared from a mixture as follows: 100 eq. isophthalic acid, 42.3 eq. ethylenediamine, and 42.3 eq D-400. A black ink and a blue ink are prepared as set forth above.

Example 52

A polyamide resin is prepared from a mixture as follows: 100 eq. isophthalic acid, 2.6 eq ethanolamine, and 71.2 eq. monoethanolamine. A black ink and a blue ink are prepared as set forth above.

Example 53

A polyamide resin is prepared from a mixture as follows: 100 eq. isophthalic acid, and 63.3 eq. monoethanolamine. A black ink and a blue ink are prepared as set forth above.

Example 54

A polyamide resin is prepared from a mixture as follows: 65 eq. isophthalic acid, 35 eq. of $C_{21}$ diacid, 45 eq. ethylenediamine, and 20 eq. of hexamethylenediamine. A black ink and a blue ink are prepared as set forth above.

Example 55

A polyamide resin is prepared from a mixture as follows: 100 eq. isophthalic acid, 16.7 eq. ethylenediamine, and 50.1 D-400. A black ink and a blue ink are prepared as set forth above.

Example 56

A polyamide resin is prepared from a mixture as follows: 65 eq. isophthalic acid, 35 eq. of $C_{21}$ diacid, and 65 eq. ethylenediamine. A black ink and a blue ink are prepared as set forth above.

Example 57

A polyamide resin is prepared from a mixture as follows: 75 eq. isophthalic acid, 25 eq. of $C_{21}$ diacid, 57 eq. monoethanolamine, and 12.3 hexamethylenediamine. A black ink and a blue ink are prepared as set forth above.

Example 58

A polyamide resin is prepared from a mixture as follows: 75 eq. isophthalic acid, 25 eq. of $C_{21}$ diacid, and 87 eq. ethylenediamine. A black ink and a blue ink are prepared as set forth above.

Example 59

A polyamide resin is prepared from a mixture as follows: 100 eq. isophthalic acid, 57.8 eq. ethylenediamine, and 19.2 D-400. A black ink and a blue ink are prepared as set forth above.

Example 60

A polyamide resin is prepared from a mixture as follows: 75 eq. isophthalic acid, 25 eq. of $C_{21}$ diacid, and 62 eq.

ethylenediamine. A black ink and a blue ink are prepared as set forth above.

Example 61

A polyamide resin is prepared from a mixture as follows: 50 eq. isophthalic acid, 50 eq. of $C_{21}$ diacid, 66.1 eq. ethylenediamine, and 4.3 hexamethylenediamine. A black ink and a blue ink are prepared as set forth above.

Example 62

A polyamide resin is prepared from a mixture as follows: 50 eq. isophthalic acid, 50 eq. of $C_{21}$ diacid, and 82 eq. ethylenediamine. A black ink and a blue ink are prepared as set forth above.

Example 63

A polyamide resin is prepared from a mixture as follows: 65 eq. isophthalic acid, 35 eq. of $C_{21}$ diacid, 68 eq. monoethanolamine, and 1.7 D-230. A black ink and a blue ink are prepared as set forth above.

Example 64

A polyamide resin is prepared from a mixture as follows: 67.55 eq. isophthalic acid, 32.5 eq. of $C_{21}$ diacid, and 91 eq. ethylenediamine. A black ink and a blue ink are prepared as set forth above.

Example 65

A polyamide resin is prepared from a mixture as follows: 87.5 eq. isophthalic acid, 12.5 eq. of $C_{21}$ diacid, 51 eq. monoethanolamine, and 15.4 D-230. A black ink and a blue ink are prepared as set forth above.

Example 66

A polyamide resin is prepared from a mixture as follows: 87.5 eq. isophthalic acid, 12.5 eq. of $C_{21}$ diacid, and 61.8 eq. monoethanolamine. A black ink and a blue ink are prepared as set forth above.

Example 67

A polyamide resin is prepared from a mixture as follows: 87.5 eq. isophthalic acid, 12.5 eq. of $C_{21}$ diacid, and 83.3 eq. ethylenediamine. A black ink and a blue ink are prepared as set forth above.

Example 68

A polyamide resin is prepared from a mixture as follows: 87.5 eq. isophthalic acid, 12.5 eq. of $C_{21}$ diacid, 40.2 eq. ethylenediamine, and 26.8 hexamethylenediamine. A black ink and a blue ink are prepared as set forth above.

Example 69

A polyamide resin is prepared from a mixture as follows: 67.5 eq. isophthalic acid, 32.5 eq. of $C_{21}$ diacid, and 70 eq. monoethanolamine. A black ink and a blue ink are prepared as set forth above.

What is claimed is:

1. A method of preparing a pigment dispersion useful in the preparation of printing inks, said method comprising dispersing a colorant pigment in an aqueous medium further comprised of a dispersing binder resin composition, said aqueous medium being essentially free of volatile organic solvents and said dispersing binder resin consisting essentially of the reaction product of a mixture of X equivalent percent of an acid component and Z equivalent percent of an amine component wherein the acid component is comprised of an aromatic dicarboxylic acid alone or in a mixture with an aliphatic dicarboxylic acid having from 2–25 carbon atoms, and said amine component is comprised of a mixture of a diamine and monoalkanol amine and the ratio of Z:X is less than 1 to provide a polyamide having an acid value greater than about 35.

2. A pigment dispersion comprising a colorant pigment dispersed in an aqueous medium further comprised of a dispersing binder resin composition, said aqueous medium being essentially free of volatile organic solvents and said dispersing binder resin consisting essentially of the reaction product of a mixture of X equivalent percent of an acid component and Z equivalent percent of an amine component wherein the acid component is comprised of an aromatic dicarboxylic acid alone or in a mixture with an aliphatic dicarboxylic acid having from 2–25 carbon atoms, and said amine component is comprised of a mixture of a diamine and monoalkanol amine and the ratio of Z:X is less than 1 to provide a polyamide having an acid value greater than about 35.

3. A method of preparation of printing inks comprising letting down a pigment dispersion of claim 2 with an aqueous composition comprised of a binder resin and being essentially free of volatile organic solvents.

4. A printing ink composition comprising a mixture of a pigment dispersion of claim 2 with an aqueous; composition comprised of a binder resin and being essentially free of volatile organic solvents.

5. A method of printing comprising applying an aqueous printing ink as claimed in claim 4 to a first essentially impervious printing surface, said surface having recesses therein which define a resolvable image and which carrying said aqueous printing ink, contacting a first surface of a printable substrate with said first essentially impervious printing surface by applying pressure to a reverse surface of said printable substrate.

6. The method of claim 3 wherein the binder resin is different than the dispersing binder resin.

7. The method of claim 6 wherein the binder resin is a (meth)acrylate binder resin.

8. The composition of claim 4 wherein the binder resin is different than the dispersing binder resin.

9. The composition of claim 8 wherein the binder resin is a (meth)acrylate binder resin.

* * * * *